United States Patent Office 3,487,898
Patented Jan. 6, 1970

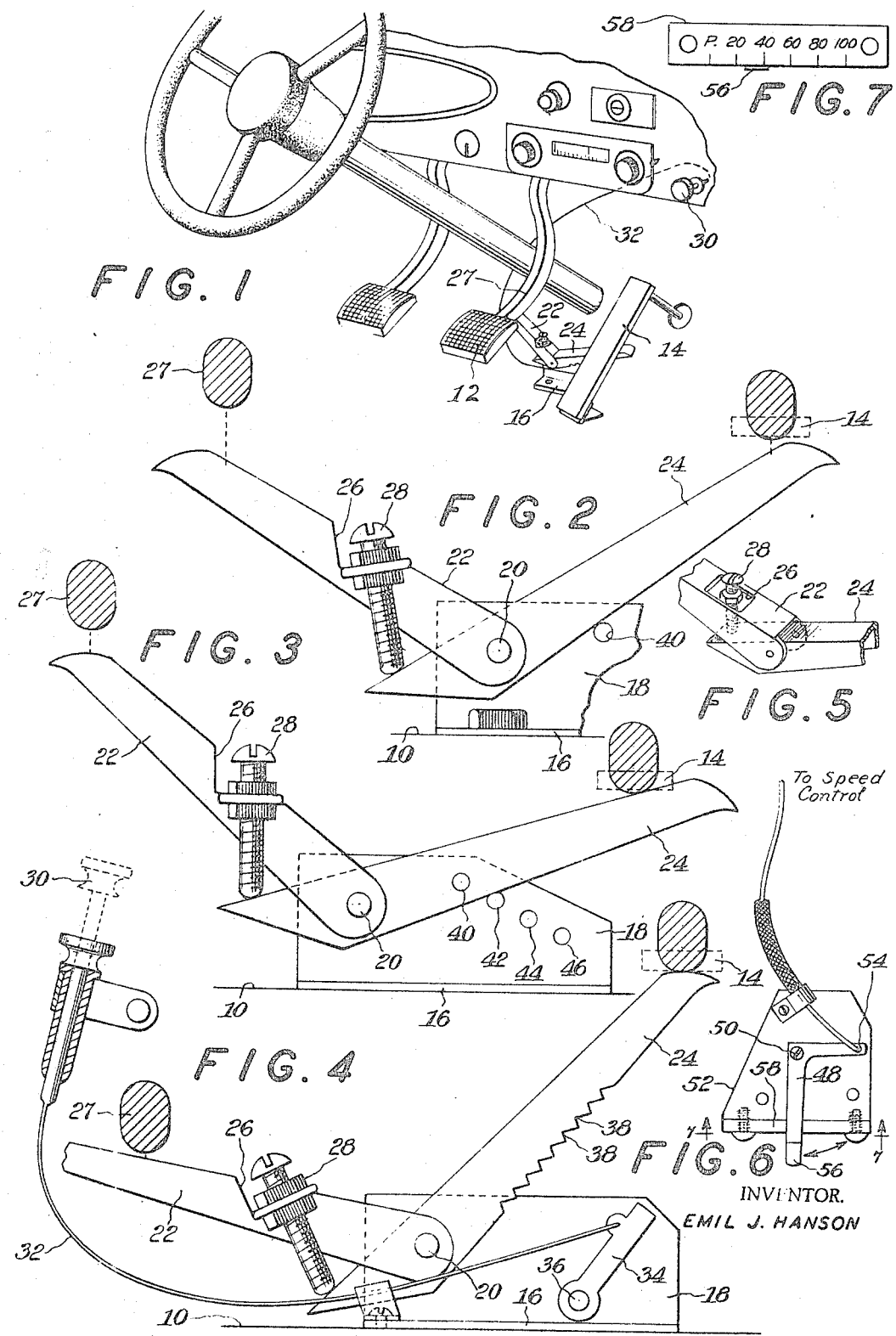

3,487,898
VEHICLE BRAKE AND ACCELERATOR CONTROLS
Emil J. Hanson, 2340 W. Marne Ave.,
Milwaukee, Wis. 53209
Filed June 17, 1968, Ser. No. 737,571
Int. Cl. G05g 9/00; F16d 23/00; B60r 25/08
U.S. Cl. 192—3                                1 Claim

ABSTRACT OF THE DISCLOSURE

A device adapted to be used in an automobile to control the speed in order to limit the maximum speed of travel as well as enabling operation of either one of the foot brake and foot accelerator pedal, when utilized, to disable the other.

SUMMARY OF THE INVENTION

In my invention, first means limit the downward excursion of the accelerator pedal, when pressed downward to accelerate the automobile whereby a preselected maximum speed cannot be exceeded. Second means interconnects the foot brake and pedal in a manner at which the brake is automatically forced to its off position when the pedal is depressed and the pedal is forced to its extreme upward position when the brake is depressed. The pedal can be locked in its extreme upward position to prevent the automobile from being driven.

BRIEF DESCRIPTION OF THE DRAWINGS

In the drawings:
FIG. 1 is a perspective view of my device;
FIGS. 2, 3 and 4 are side views of different modifications of a mechanism used in the device of FIG. 1;
FIG. 5 is a detail view of interconnection of certain parts shown in FIGS. 2, 3 and 4;
FIG. 6 shows an alternative form of a portion of my invention; and
FIG. 7 is a view through 7—7 in FIG. 6.

DETAILED DESCRIPTION OF PREFERRED EMBODIMENTS

Referring now to FIGS. 1, 4 and 5, disposed on the floor 10 of an automobile underneath the foot brake operator 12 and the accelerator pedal 14 is a flat horizontal plate 16 supporting a vertical plate 18 having a horizontal shaft 20. First and second elongated inclined members 22 and 24 extend between and under brake operator 12 and pedal 14 with the upper end of member 22 bearing against the brake arm 27 and the upper end of member 24 bearing against the surface under the pedal 14. The lower ends of these members are disposed side by side and are pivotable about shaft 20. Member 22 has a slot 26 through which a vertically movable screw 28 extends, the bottom end of the screw bearing against the bottom end of member 24. By this arrangement when the pedal is pressed down to accelerate, the brake operator is forced upward and off, while when the brake operator is pressed down, the pedal is forced up to off.

The choke knob 30 on the instrument panel is connected by flexible shaft 32 to one end of lever 34, the other end being pivotally secured by horizontal pin 36 supported by plate 18. Member 24 has a plurality of notches 38 on its lower side. By pulling the choke out to desired position, the lever can be moved to a position engageable with a selected notch. As a result, the pedal when depressed, can only move downward for enough to engage the notch with the lever, thus limiting the speed. The speed limitation can be removed by pushing the knob inward whereby the lever is moved out of the path of the notches and the pedal can be pressed to the floor.

FIG. 2 shows the plate 18 with a hole 40 through which a padlock can be inserted to prevent the pedal from being pressed downward, thus preventing operation of the automobile.

In FIG. 3, plate 18 has a plurality of offset vertically displaced holes 40, 42, 44 and 46. The lock can be placed in any hole to limit the downward movement of the pedal for speed control (thus eliminating need for the choke and lever of FIG. 4) or to lock the pedal.

In FIGS. 6 and 7, the shaft 32 connected at its bottom end as shown in FIG. 4, can be connected to one end 54 of an L shaped horizontal speed setting lever 48. The central or junction of legs point 50 of the lever is pivotally secured to horizontal plate 52 and the front end 56 of the plate can be moved along the speed calibrated dial 58 to determine the speed setting.

While I have described my invention with particular reference to the drawings, such is not to be considered as limiting its actual scope.

Having thus described this invention, what is asserted as new is:

1. In combination with an automobile having a foot brake operator and a foot operated accelerator pedal, a safety device comprising:
   first means to limit the downward excursion of the pedal when pressed down to accelerate the automobile whereby a preselected maximum speed cannot be exceeded; and
   second means interconnecting said brake operator and said pedal in a manner at which said brake operator is automatically forced to its off position when the pedal is depressed and said pedal is forced to its extreme upward position when the brake operator is depressed, and said first means includes a lever and wherein said second means is provided with a plurality of notches, said lever being engageable with any selected one of said notches.

References Cited

UNITED STATES PATENTS

| | | | |
|---|---|---|---|
| 2,100,225 | 11/1937 | Stein | 192—3 |
| 2,317,935 | 4/1943 | Myerson | 192—3 |
| 2,723,009 | 11/1955 | Kordas et al. | 192—3 |
| 2,798,468 | 7/1957 | Heidner | 123—98 |
| 2,856,042 | 10/1958 | England | 192—3 |
| 3,006,445 | 10/1961 | Green et al. | 192—3 |

BENJAMIN W. WYCHE III, Primary Examiner

U.S. Cl. X.R.

180—114; 74—478.5